United States Patent
Rogers et al.

(10) Patent No.: US 7,729,524 B2
(45) Date of Patent: *Jun. 1, 2010

(54) ASSESSMENT OF RADIOGRAPHIC SYSTEMS AND OPERATORS USING TASK-BASED PHANTOM

(75) Inventors: Michael K. Rogers, Mendon, NY (US); Xiaohui Wang, Pittsford, NY (US); Lynn M. Fletcher-Heath, Rochester, NY (US); Michael D. Heath, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 11/956,700

(22) Filed: Dec. 14, 2007

(65) Prior Publication Data

US 2008/0130839 A1 Jun. 5, 2008

Related U.S. Application Data

(63) Continuation-in-part of application No. 11/403,397, filed on Apr. 13, 2006.

(60) Provisional application No. 60/671,598, filed on Apr. 15, 2005.

(51) Int. Cl.
G06K 9/00 (2006.01)
B41M 5/00 (2006.01)

(52) U.S. Cl. .................... 382/128; 382/199; 378/28
(58) Field of Classification Search ............. 382/100, 382/128, 129, 130, 131, 132, 133, 134, 162, 382/169, 172, 181, 189, 194, 209, 232, 255, 382/274, 276, 289, 305, 312, 199; 378/26, 378/28

See application file for complete search history.

(56) References Cited

U.S. PATENT DOCUMENTS

| 6,409,383 | B1 | 6/2002 | Wang et al. |
| 6,639,966 | B2 | 10/2003 | Lautenschlager et al. |
| 6,674,834 | B1 | 1/2004 | Acharya et al. |
| 6,694,047 | B1 * | 2/2004 | Farrokhnia et al. .......... 382/132 |

OTHER PUBLICATIONS

Text Book, R. van Engen et al., Quality Control of the Physical and Technical Aspects of Mammography Screening, Part B: Digital Mammography, 4th Edition, Luxembourg: European Commission, 2006, www.euref.org, ISBN 92-79-01258-4.*

(Continued)

*Primary Examiner*—Seyed Azarian (57) ABSTRACT

A method for image quality assessment of a digital radiography system extracts and isolates one or more individual targets from a phantom image, then obtains operator responses by displaying each isolated individual target and recording a corresponding operator response related to image appearance for each isolated individual target. The accumulated operator responses are stored to obtain the image quality assessment.

23 Claims, 7 Drawing Sheets

OTHER PUBLICATIONS

K. Bijkerk et al., Modification of the CDMAM Contrast-Detail Phantom for Image Quality Evaluation of Full-Field Digital Mammography Systems, University Medical Cente, IWDM 2000 ~30-640.*
1984, ppG. Cohen et al., Analysis of Variations in Contrast-Detail Experiments, Med. Phys. 11 (4), Jul/Aug, !469-473.*
M. Thijssen et al., Comparison of the Detectability of Small Details in a Film-Screen and a Digital Mammography System by the Imaging of a New CDMAM-Phantom, M. Yaffe ed., Medical Physics Publishing, Proceedings of the IWDM Workshop, Jun. 2000, pp. 666-672.
Text Book, A. Rose, Vision Human and Electronic, Plenum Press-New York, 1973, ISBN 0-306-30732-4.
M. Thijssen et al. A Definition of Image Quality: The Image Quality Figure, BIR Report 20, 1990, pp. 29-34.
British Standards Catalog, BS EN 62220-1:2004, International Electrotechnical Commission, Medical Electrical Equipment-Characteristics of Digital X-ray Imaging Devices-Part 1: Determination of the Detective Quantum Efficiency, 2003.
P. Sharp et al., ICRU Report 54 International Commission on Radiation Unit, Medical Imaging—The Assessment of Image Quality, Dec. 1995, p. 15.
Ruben Rico et al., Automatic Scoring of CDMAM: A Dose Study, Proc. SPIE, vol. 5034, 2003, pp. 164-173.
N. Karssemeijer et al., Determination of Contrast-Detail Curves of Mammography Systems by Automated Image Analysis, Digital Mammography 96' Proceedings of the 3rd International workshop on Digital Mammography, 1996, pp. 155-160.
K. Bijkerk et al., Modification of the CDMAM Contrast-Detail Phantom for Image Quality Evaluation of Full-Field Digital Mammography Systems, University Medical Cente, IWDM 2000 Report, pp. 630-640.
R. Visser and N. Karsseijer, CDCOM Manual, http:www.euref.org, (2003).
A. E. Burgess, Comparison of Receiver Operating Characteristic and Forced Choice Observer Performance Measurement Methods, Med. Phys. 22 (5), May 1995, pp. 643-655.
M. Tapiovaara et al., How Should Low-Contrast Detail Detectability be Measured in Fluoroscopy?, Med. Phys. 31 (9), Sep. 2004, pp. 2564-2576.
R. F. Wagner et al., Signal Detection Theory and Medical Image Assessment, Recent Developments in Digital Imaging, ed.-American Institute of Physics, 1985, pp. 39-59.
T. Fearon, A Comparison Evaluation of Rare-Earch Screen-Film Systems: System Speed, Contrast, Sensitometry, RMS Noise, Square-Wave Response Function, and Contrast-Dose-Detail Analysis, Invest. Radiol. 21, 1986, pp. 654-662.
G. Cohen et al., Analysis of Variations in Contrast-Detail Experiments, Med. Phys. 11 (4), Jul./Aug. 1984, pp. 469-473.
L-N. D. Loo et al., An Empirical Investigation of Variability in Contrast-detail-Diagram Measurements, Proc. SPIE vol. 419., Apr. 1983, pp. 68-76.
S. R. Thompson et al., A Phantom for the Measurement of Contrast Detail Performance in Film-Screen Mammography, The British Journal of Radiology, vol. 64 No. 767, 1991, pp. 1049-1055.

* cited by examiner

ASSESSMENT OF RADIOGRAPHIC SYSTEMS AND OPERATORS USING TASK-BASED PHANTOM

CROSS REFERENCE TO RELATED APPLICATIONS

This is a continuation-in-part of U.S. patent application Ser. No. 11/403,397 filed on Apr. 13, 2006 entitled "SYSTEM AID FOR DIGITAL RADIOGRAPHIC IMAGE QUALITY VERIFICATION" in the names of Heath et al. which, in turn, claims priority from U.S. Ser. No. 60/671,598, filed as a provisional patent application on Apr. 15, 2005, entitled "SYSTEM AID FOR DIGITAL RADIOGRAPHIC IMAGE QUALITY VERIFICATION", in the names of Heath et al., commonly assigned.

FIELD OF THE INVENTION

This present invention generally relates to radiography, and more particularly to an image analysis and presentation system for reading an image signal of a test phantom, detecting target boundaries, isolating phantom image components, calculating image statistics, rendering each component optimally for human observation, obtaining human observations, and using this data for system assessment and performance tracking of a radiographic system.

BACKGROUND OF THE INVENTION

Radiography refers to a general system, or modality, for recording a radiation image from the transmission of x-rays through an object, such as a body of a patient. Conventional radiography uses a film/screen combination as the capture device, while digital radiography can employ a digital detector (DR) or a stimulable phosphor plate (generally referred to as computed radiography, CR). For either digital radiography technology, the output digital signal is usually converted into a unit that is linear with the logarithm of incident exposure. Digital systems can record radiation exposure over a wide dynamic range, typically on the order of 10,000:1, so that exposure error is seldom a problem.

As with conventional radiography, equipment acceptance and continued quality assurance are required for digital radiography systems, to varying degrees, for each diagnostic institution and/or region. For example, guidelines for acceptance and scheduled testing of mammography systems have been outlined in the European Protocol for the Quality Control of the Physical and Technical Aspects of Mammography Screening, Part B: Digital Mammography, also generally referred to as EPQCM. Refer to R. van Engen, K. Young, H. Bosmans, and M. Thijssen, European Protocol for the Quality Control of the Physical and Technical Aspects of Mammography Screening, Part B: Digital Mammography, Draft Edition January 2005, European Commission, National Expert and Training Centre for Breast Cancer Screening 451, University Medical Centre Nijmegen, P.O. Box 9101, 6500 HB Nijmegen, The Netherlands Nijmegan, The Netherlands, January 2005.

One image quality criterion prescribed by the EPQCM addresses the requirement that low-contrast small-diameter objects be visibly differentiated from a uniform background. This stands as a surrogate for the requirement for diagnostic systems to provide adequate visibility of masses and microcalcifications. Contrast-detail studies have traditionally been used for this purpose. See for example, A. Rose, Vision Human and Electronic, Plenum Press, New York (1973); M. Thijssen et al., "A definition of image quality: the image quality figure," BIR Report 20, pp 29-34 (1990); S. R. Thompson and K. Faulkner, "A phantom for the measurement of contrast detail performance in film-screen mammography," British J. Radiol. 64, 1049-1055 (1991); L-N. D. Loo, K. Doi, M. Ishida, C. E. Metz, "An empirical investigation of variability in contrast-detail diagram measurements," Proc SPIE (The International Society for Optical Engineering) 419, 68-76 (1983); G. Cohen, D. L. McDaniel and L. K. Wagner, "Analysis of variations in contrast-detail experiments," Med. Phys. 11, 469-473 (1984); and T. Fearon et al., "A comparison evaluation of rare-earth screen-film systems: system speed, contrast, sensitometry, RMS noise, square-wave response function and contrast-dose-detail analysis," Investigative Radiology 21, 654-662 (1986).

The EPQCM recognizes the well-known limitations of traditional contrast-detail methods, based on a single image of a Rose-Burger phantom, by adopting multiple images of an alternative forced-choice phantom. (See R. F. Wagner, C. E. Metz and D. G. Brown, "Signal detection theory and medical image assessment," in Recent developments in digital imaging, ed. K. Doi, L. Lanzl and P-J. P. Lin, AAPM (American Association of Physical Medicine) Monograph 12, American Institute of Physics (1985)). This choice is supported by a recent comparison of subjective and objective measures of detail detectability as well as detailed analysis of the efficiency of multiple-forced-choice methods. Refer to M. J. Tapiovaara and M. Sanborg, "How should low-contrast delectability be measured in fluoroscopy," Med. Phys. 31, 2564-2576 (2004). Refer also to A. E. Burgess, "Comparison of receiver operating characteristic and forced choice observer performance measurement methods," Med. Phys. 22, 643-655 (1995).

The EPQCM methodology is described in detail in section 2.4.1 (threshold contrast sensitivity) of the EPQCM. In particular, images of a suitable contrast-detail phantom are to be acquired with clinical technique factors. Visual scoring and analysis predicts the threshold contrast target for each target diameter. Forced-choice or task-based phantoms can be differentiated from other types of radiology phantoms in that these phantoms typically require a certain sequence of evaluation steps from the observer. For example, in one characteristic sequence, the operator works through a series of visual patterns obtained from the phantom, where each successive pattern is more difficult to detect. The operator then scores system performance based on the visual threshold beyond which the pattern becomes too difficult to discern clearly. For mammography systems worldwide, there are two particularly well-known phantoms that are used in this task-based manner: the CDMAM phantom and the ACR (American College of Radiology) phantom.

The CDMAM phantom template employs a plurality of squares, wherein each square contains two identical discs (same thickness, same diameter), one in the center and one in a randomly chosen corner. With the CDMAM contrast-detail phantom for mammography images, the threshold contrast of an imaging system is determined as a function of object diameter by the detection of pairs of low-contrast objects. The most recent version of the phantom, CDMAM 3.4, tests the ability of observers to visualize gold disks ranging in diameter from about 0.06 to about 2.0 mm and in thickness from about 0.03 to about 2.0 μm. Refer to R. Visser and N. Karssemeijer, "CDCOM Manual: software for automated readout of CDMAM 3.4 images". The CDCOM software, manual and sample images are currently posted at http://www.euref.org.

This results in an approximate radiation contrast range of about 0.5% to about 30%. K. R. Bijkerk, M. A. O. See Thijssen, Th. J. M. Arnoldussen, IWDM (International Workshop on Digital Mammography) 2000 report: Modification of the CDMAM contrast-detail phantom for image quality of Full Field Digital Mammography systems, University Medical Centre Nijmegan, St. Radboud, The Netherlands, 2000. The contrast range is approximate, which is due to the clinical variability of the technique (filtration, kVp, and detector material) used for testing. The CDMAM 3.4 phantom was redesigned from older versions specifically to accommodate digital systems that potentially have improved-system DQE and MTF (modulation transfer function) over traditional film screen systems. See M. A. O. Thijssen, W. Veldkamp, R. Van Engen; M. Swinkels, N. Karssemeijer, J. Hendricks, "Comparison of the detectability of small details in a film-screen and a digital mammography system by the imaging of a new CDMAM-phantom", Proceedings of IWDM 2000, pp. 666-672, M. Yaffe ed, Medical Physics Publishing, Madison, Wis., Toronto, 2000.

Although not permitted by the EPQCM guidelines, automated software observers have been developed to evaluate CDMAM images. One of these was developed by Karssemeijer and Thijssen. Refer to N. Karssemeijer, M. A. O. Thijssen, "Determination of contrast-detail curves of mammography systems by automated image analysis" in Digital Mammography '96, Proceedings of the 3rd International Workshop on Digital Mammography, 155-160 (1996). It is believed to be available on the EUREF website (http://www.euref.org) along with a manual.

Other automated scoring methods continue to be developed in recognition of the complexities associated with implementing the visual threshold contrast sensitivity test. For example, Rico et al. implemented a software scoring method that they compared with visual measurements as a function of dose. (See R. Rico, S. Muller, G. Peter, A. Noel, and J. Stines, "Automatic scoring of CDMAM: A dose study," Proc. SPIE 5034, 164-173 (2003).) Although a good correlation of IQF (image quality figure, a summary performance measure) was reported, the software method demonstrated higher detection sensitivity than that of the human observers in the study. The use of the IQF metric precludes analysis of their data in terms of the EPQCM criteria.

Other analytical approaches are being investigated and may be promising. Ongoing work in IEC working group 62B is working to standardize the measurement of mammographic DQE in a manner similar to the current standard for general radiography. (See: "Medical electrical equipment—Characteristics of digital X-ray imaging devices—Part 1—Determination of the detective quantum efficiency" IEC 62220-1 Ed. 1, International Electrotechnical Commission (2003)). Such measurements can be used together with well-established methods to predict signal-to-noise performance metrics for either ideal or human observers. (See P. Sharp et al. "Medical imaging—the assessment of image quality," ICRU Report 54, International Commission on Radiation Unit, Bethesda, Md. (1995)). Work is also currently underway in several laboratories to produce a software scoring tool that matches human visual performance.

At present, the EPQCM is being used as a guideline and is not used as a regulatory document. It is, however, anticipated that region specific regulations may be implemented based on the guidance of the EPQCM. Therefore, some clinical sites are beginning to require compliance with the EPQCM guidelines for equipment-purchase tenders.

It is anticipated that CDMAM or ACR (American College of Radiology) task-based phantom evaluation will be required regulatory prerequisites for mammography system use, with assessment using these task-based phantoms scheduled at various intervals. In light of this possible development, and with the goal of making mammography and radiological systems in general more reliable and easier to test, it can be seen that there is a need for tools that improve system assessment workflow.

Currently, even though the phantom is typically displayed to the operator on a high-resolution display screen, assessment of digital mammography systems is performed manually, using one of the task-based phantoms. An operator, trained to use the particular phantom, follows a recommended sequence for assessing its various parts and scoring system performance according to these parts of phantom, as was described earlier. The operator sequence for task-based phantom evaluation follows the guidelines of the system manufacturer and may vary from one session to another. For example, full assessment of each target of the phantom may not be necessary at each assessment session; at various intervals between full assessment cycles, only spot-checking may be needed. For such condensed or streamlined testing sessions, only a subset of the phantom targets must be assessed by the observer. At other times, the full phantom may need to be used. Test sequences may be mandated by regulatory requirements or may simply be site-specified according to practices at a particular medical imaging facility. Operator records are maintained on paper and stored as proof that the system assessment was properly performed at a particular time.

Conventional use of task-based phantoms is limited to one-time assessment and fraught with problems. As can be appreciated, the need for operator training on the phantom is a disadvantage and indicates a likelihood of operator error. Maintaining paper records is also a problem and is a disadvantage not only because of the likelihood of loss or misplacement but also because scoring and other information obtained is not accessible to HIS/RIS or other information or archival systems. No longer-term objective is served; the data that has been obtained from test readings is simply stored in a folder. Phantom assessment can be highly subjective, and an operator under pressure or confused by the procedural sequence may give inaccurate results. In some cases, an operator could even "learn" a type of phantom or attempt to short-cut the intended procedures, so that adequate care in assessment is compromised.

Given these considerations, there is a need for apparatus and methods that improve workflow and make better use of the information obtained from task-based phantoms.

SUMMARY OF THE INVENTION

It is an object of the present invention to enhance the usability and value of task-based phantoms. With this object in mind, the present invention provides a method for image quality assessment of a digital radiography system comprising steps of: a) isolating one or more individual targets from a phantom image; b) obtaining operator responses by displaying each isolated individual target and recording a corresponding operator response related to image appearance for each isolated individual target; and c) storing the accumulated operator responses to obtain the image quality assessment.

It is a feature of the present invention that it obtains a task-based phantom assessment of a system as data that can be used by other information and administrative systems.

It is an advantage of the present invention that it provides tools that not only automate, but help to manage and coordinate the sequence followed by an operator to assess a task-based phantom.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

The following is a detailed description of the preferred embodiments of the invention, reference being made to the drawings in which the same reference numerals identify the same elements of structure in each of the several figures.

Figure 1:
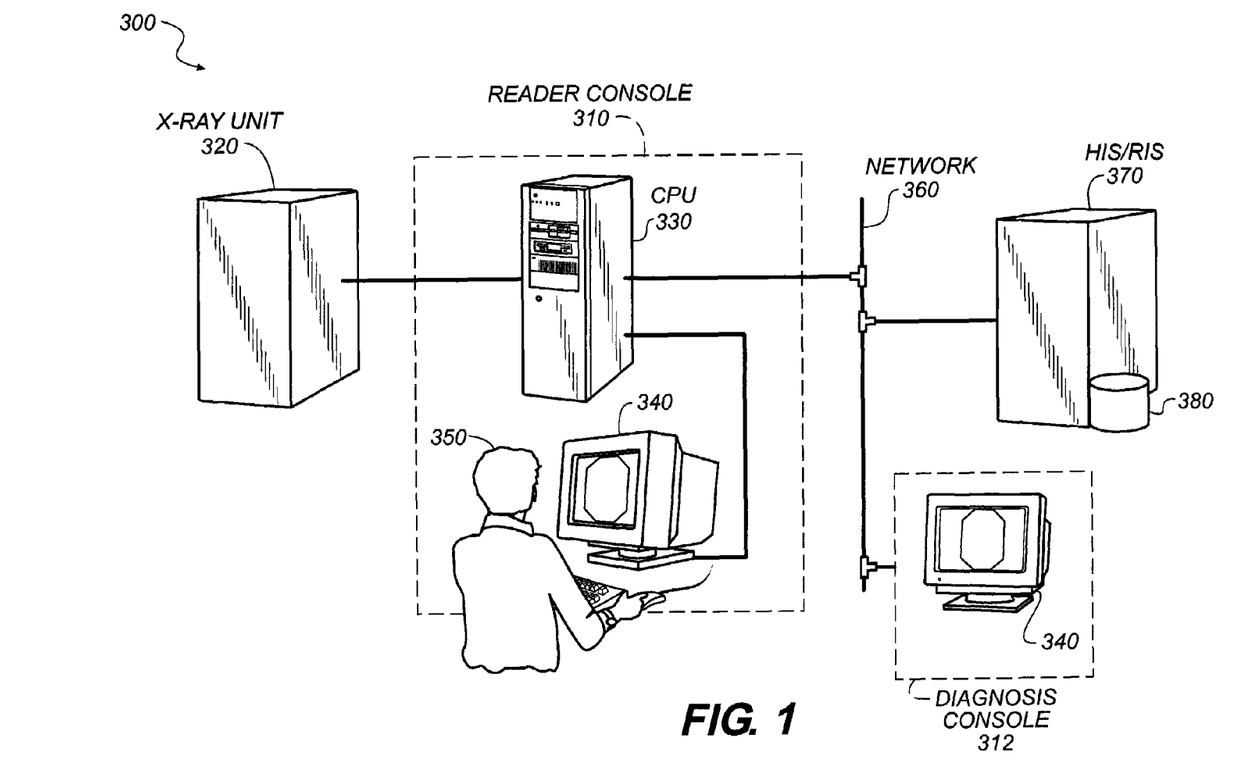
FIG. 1 shows a schematic diagram of system components for task-based phantom evaluation according to one embodiment.

FIG. 1 shows a schematic diagram of system components for task-based phantom evaluation in a radiology system 300 according to one embodiment. Components of a reader console 310, indicated within a dashed outline, can be used or modified for obtaining task-based phantom information according to the present invention. Alternately, a diagnosis console 312 can be used for obtaining task-based phantom information. Both consoles 310 and 312 include a display 340 at which operator evaluation is obtained, along with supporting computer workstation hardware for image processing and control logic components.

Radiology system 300 includes an X-ray unit 320 and a control logic processor 330 located within reader console 310. An operator 350, qualified to assess the image quality of radiology system 300, makes the necessary decisions required in the workflow sequence that is described subsequently. The operator alternately may do this work at a separate diagnosis console 312, typically located on the same network 360. Operator entries are processed by control logic processor 330 and can be provided, such as using network 360 or other connection, to an information system 370, such as an HIS/RIS (Hospital Information System/Radiology Information System) system. A database 380, typically accessed or controlled from information system 370, then stores the results of image assessment, such as operator-entered scores and other related data. Scoring can be computed from operator responses in a number of ways, familiar to those skilled in the art. In one straightforward embodiment, all accurate reads are simply counted and the raw number of correct reads is used for scoring. More complex scoring arrangements are possible.

It is instructive to note that the logic functions for execution and control of the workflow, and for use of data that is obtained from the workflow, can be controlled by control logic processor 330 that is local to radiology system 300 or may be executed at some other remote processor, such as by a networked processor.

Figure 6:
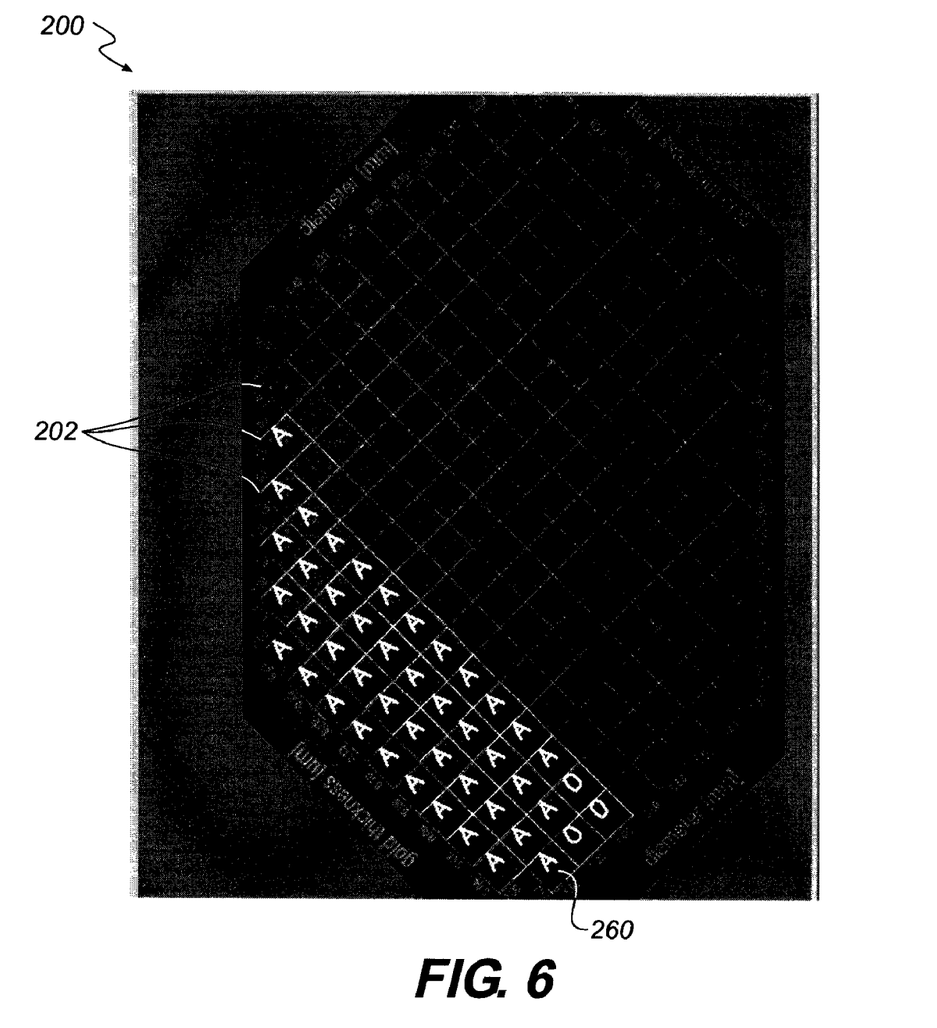
FIG. 6 shows an exemplary phantom image.
Figure 7:
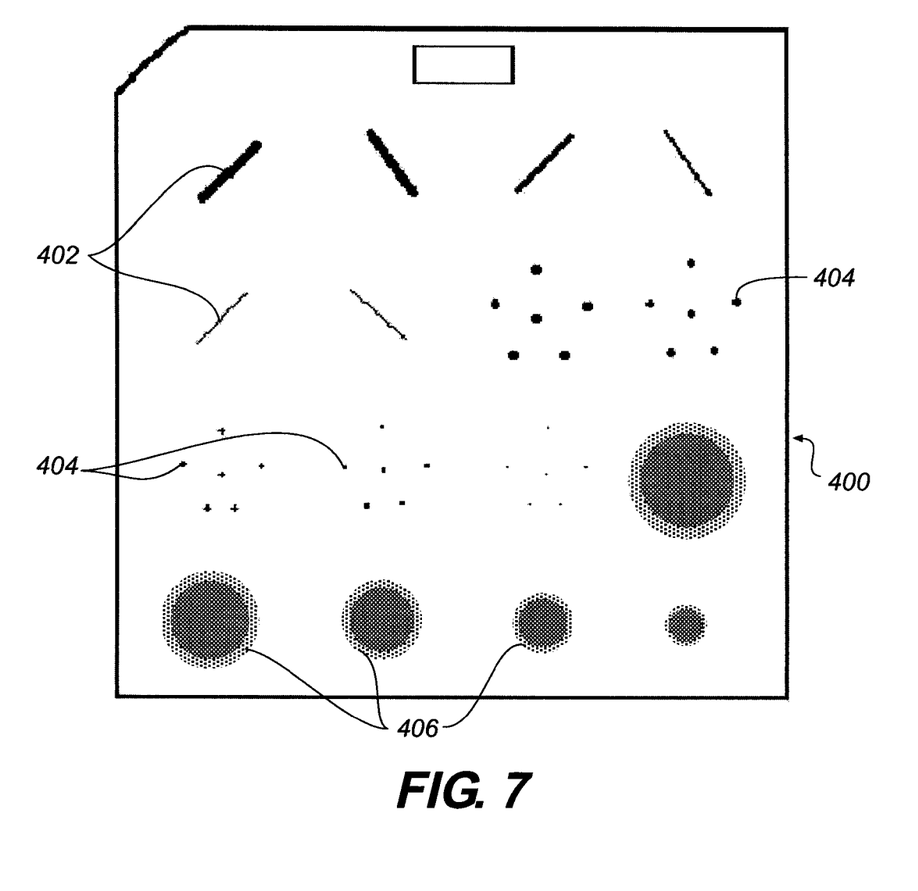
FIG. 7 shows the layout of another exemplary phantom image.

The method and apparatus of the present invention are particularly useful with task-based phantoms. These can be defined as phantoms that generally require operator sequencing through various patterns on the phantom in order to be used as assessment tools. FIGS. 6 and 7 show two types of task-based phantoms that are conventionally used with digital mammography systems. Phantom image 200 in FIG. 6 is a CDMAM phantom, having an arrangement of individual targets 202, shown within diagonally arranged rows and columns. In the conventional assessment sequence, the operator views each target 202, or a selected subset of the targets, and indicates whether or not the target is visible and other target characteristics. However, the targets are not isolated or extracted for review in the manner of the present invention.

FIG. 7 shows the overall arrangement used for an ACR phantom 400. Briefly, this phantom consists of an arrangement of targets that include diagonal lines 402, dot patterns 404, and soft dots 406. As with phantom 200, the operator is required to view successive targets and to score system performance based on phantom target visibility.

Figure 2:
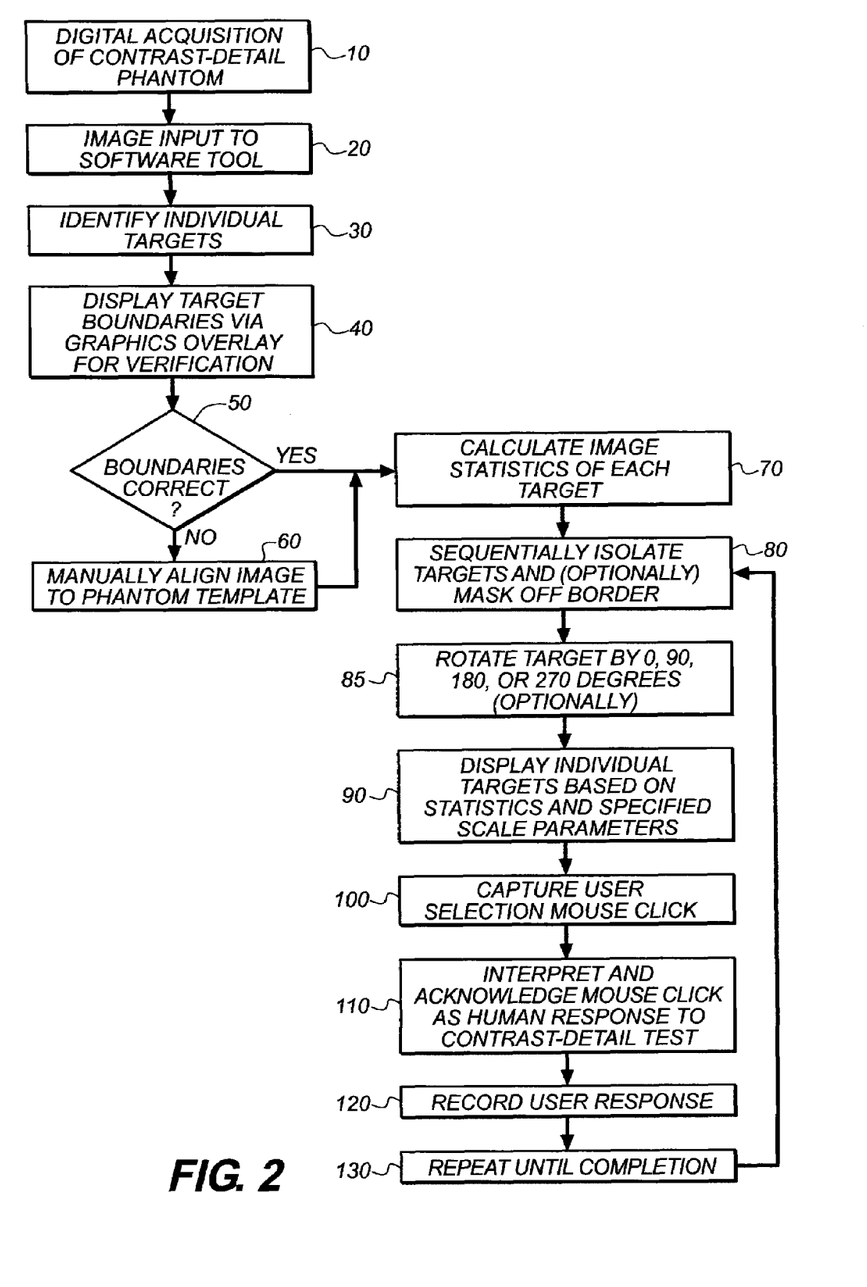
FIG. 2 shows a block diagram of a phantom image presentation system in accordance with the present invention.

FIG. 2 generally shows a flow diagram of a method in accordance with the present invention to aid in the human visual reading of phantom image data for image quality assessment. Generally, a digital image is registered to a phantom template to generate a plurality of individual targets. The individual targets are sequentially displayed to an operator, who is able to control a limited range of functions, including brightness and contrast (e.g., gray-scale display mapping). The operator indicates a decision based on the operator's visual inspection of the displayed individual target.

More particularly, the image quality verification aid is employed with phantom data acquired in accordance with a pre-specified test procedure (step 10). The acquired data is input for a software tool (step 20) wherein individual grid targets are identified and extracted for display (step 30). At step 40, target boundaries are overlaid to the full phantom image for verification. An operator can approve the boundaries or reject the boundaries at step 50. If the operator rejects the boundaries (step 60), a manual alignment to a model of the phantom can be performed to identify individual grid targets. Once the boundaries are approved by the operator, the individual grid targets are analyzed (step 70) to compute statistics/characteristics of a region of background pixels. For example, a mean and standard deviation of the background pixels may be computed.

At step 80, the targets are sequentially physically isolated for display of only a portion of the phantom at a time, typically a single target at a time. Additionally, the border area can be masked, for example, to reduce flare when observing the phantom image. An optional step, shown in FIG. 2 at step 85 can be performed, wherein the isolated individual target is rotated randomly by 0, 90, 180, or 270 degrees so as to reduce the probability of operator memorization of the target positions. The isolated individual targets are displayed based on image statistics/characteristics (determined at step 70) and/or on specified scale parameters (step 90).

The human operator then views each isolated target and chooses an appropriate response for the task (step 100), corresponding to the appearance of the target. The operator's response can be captured electronically, for example, by indicating the choice with a mouse click. Once the selection is captured, it can be interpreted based on the task while an acknowledgement is sent to the operator (step 110). A record of the operator's response can be stored in a data file for future analysis (step 120). The steps in sequence from 80 to 120 can then be repeated for each isolated individual target that has been extracted from the phantom image. At least a rudimentary amount of metadata related to the one or more targets can also be stored along with operator response data. If the operator's responses result in a failed test score, system operation may be suspended or disabled (step 140).

Figure 3:
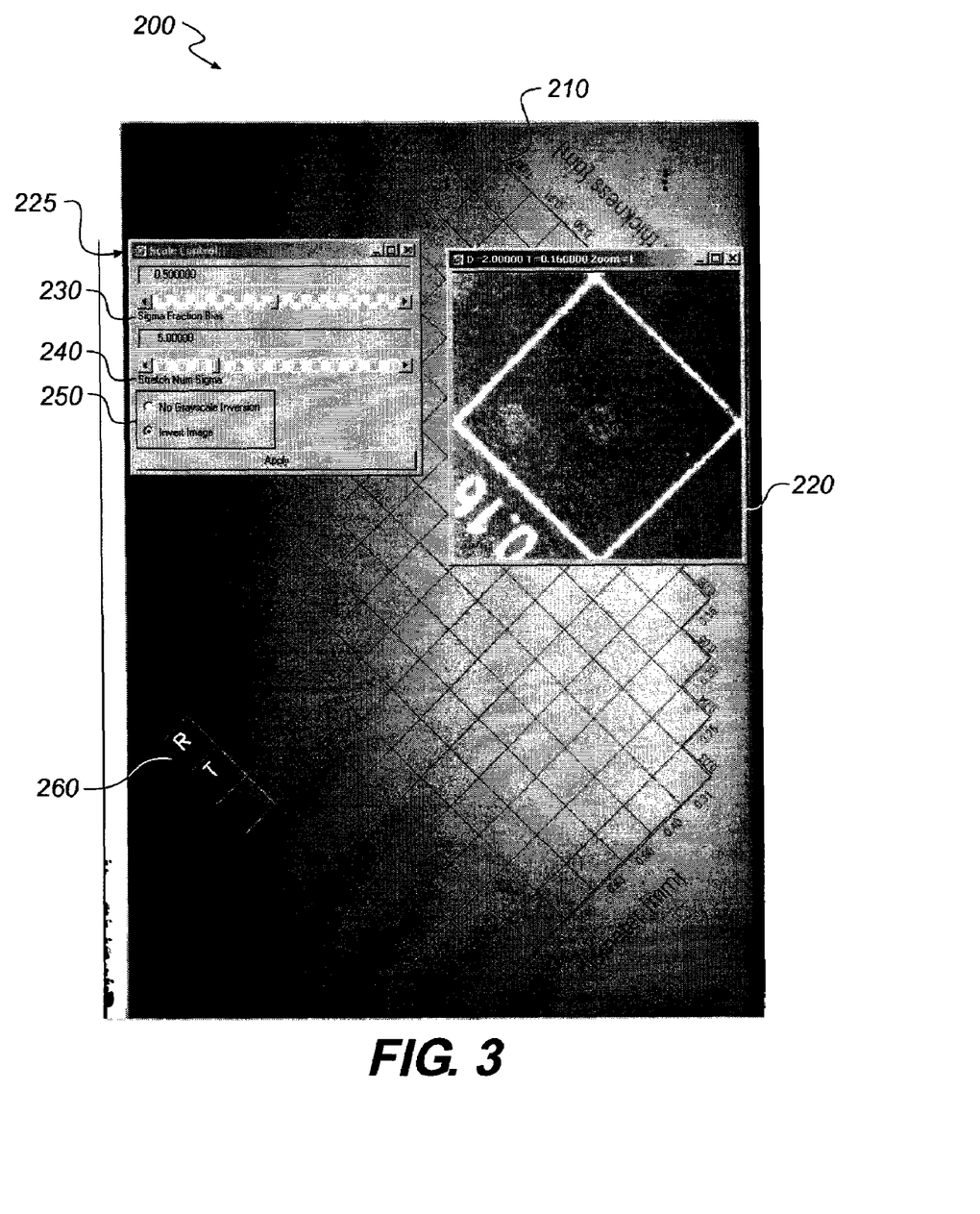
FIG. 3 shows an example of an overlay for boundary verification, isolated target with the results of automated brightness and contrast display, and an operator control to adjust the brightness and contrast display parameters.

FIG. 3 shows an exemplary acquired x-ray phantom image 200. More particularly, FIG. 3 shows an acquired x-ray image 200 of an example phantom type (CDMAM for mammography) with an overlay for boundary verification 210. It is noted that textual information on the phantom image shown in FIG. 3 can be seen, for example, the term "diameter (mm)" and corresponding numerical values. If desired, this textual information can be masked to reduce flare when the operator is observing the phantom image and also to further isolate the target.

Overlaid on the full phantom image is a window with an enlarged view of an isolated individual target 220 that has been extracted from the phantom, illustrating the results of automated brightness and contrast display. Also illustrated is an on-screen operator control 225 which can be used by the operator to adjust the brightness and contrast display parameters, specified in this example as "Sigma" 230 and "Stretch Num Sigma" 240, in addition to an inversion control 250 as offered by embodiments of the present invention. The acknowledgment, as supplied to the operator, is represented by the highlighted letters corresponding to any of top, bottom, right or left 260. Acknowledgement can also be supplied with other notations, such as the letter "A" for corner indicated by the observer as "Answered" or by the letter "O" for center indicated by the observer as "No Guess".

Figure 4:
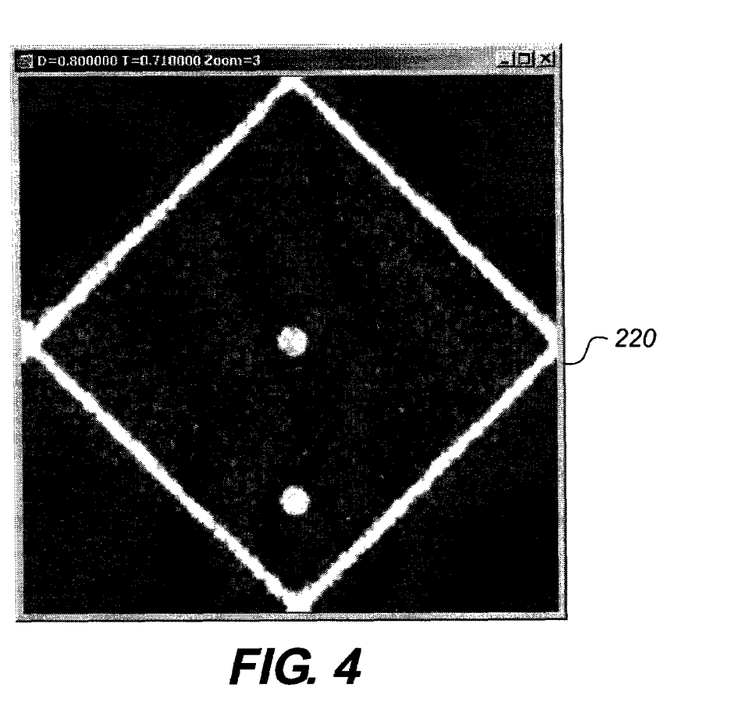
FIG. 4 shows an exemplary isolated target.

FIG. 4 shows an enlargement, for illustrative purposes only, of an isolated individual target 220 extracted from a phantom, illustrating the results of automated brightness and contrast display in one embodiment.

Figure 5:
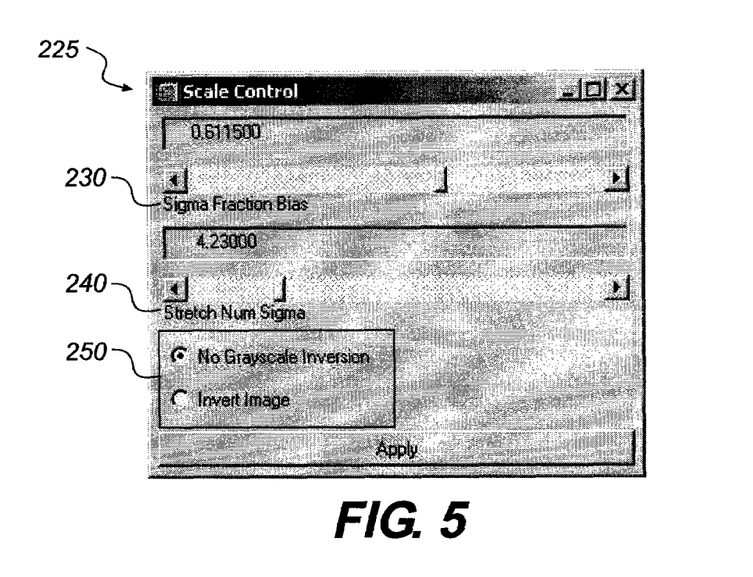
FIG. 5 shows an exemplary operator control.

FIG. 5 shows an enlargement, for illustrative purposes only, of operator control 225 which can be used to adjust the brightness and contrast display parameters, specified here as "Sigma" 230 and "Stretch Num Sigma" 240, in addition to an inversion control 250. These controls allow the operator to adjust target appearance on the display for best visibility during the assessment sequence.

As the operator responds to each displayed target 202, the full display of the phantom can be masked and can be annotated to indicate sequence progress and results. In the example of FIG. 6, the phantom image has been masked. If desired, the other textual information along the edge of the image can be masked. In addition, the operator's acknowledgement of each isolated individual target 202 that has been examined is shown with a notation "A" as "Answered" and the notation "O" as "No Guess".

Referring back to FIG. 5, contrast and brightness are calculated automatically by processor 330 based on the parameters set in "Stretch Num Sigma" 240 and inversion control 250, thereby providing statistical scaling which effectively readjusts the window width and level at each grid target in the phantom. An area/patch of background in each grid target is extracted and the data is assessed to compute the mean and standard deviation of the digital counts. These values (mean, stdev) are used to compute a range of pixels (Low, High) for display of the target, for example:

$F$=Sigma Fraction Bias $0<=F<=1.0$ $Nsig$=Stretch Num Sigma $0.1<Nsig<20$ $Bias=(F-0.5)*(2.0*Nsig*stdev)$ $Low=(Bias+mean)-Nsig*stdev$ $High=(Bias+mean)+Nsig*stdev$ The pixel values in an individual target are then linearly mapped such that Low−>0 and High−>255. If the "Invert Image" box (see element 250) of operator control 225 is selected, then those results are subtracted from 255 before the image is displayed. It is noted that the Low and High values translate to window level and width as follows:

window level=(Low+High)/2; and window width=(High−Low).

Further handling of the image data can be accomplished using methods/techniques known to those skilled in the art, for example, such as described in the previously referenced documents. Using the basic operator sequence described has a number of immediate advantages for assessing system performance efficiently and accurately. Tallying errors are eliminated, since the operator need not count up the results of readings and does not need to manually record results, but only needs to respond when prompted. Scoring procedures can be automated. The operator can focus attention on image quality, not distracted by requirements to determine which part of the sequence is performed at any point. A professional operator is not bogged down by details of what to check next, but can simply respond to each target image presented, and concentrate on the image quality and appearance characteristics, relatively independent of workflow. The procedures for viewing targets could be carried out at reader console 310 or at diagnosis console 312, according to practices followed at any particular site.

Modifications to the Operator Sequence

The operational sequence outlined in the flow chart of FIG. 2 admits a number of modifications, all within the scope of the present invention. It is instructive to describe a number of possible changes to the basic sequence. First, a number of smaller targets is generated, extracted and isolated from an image of the phantom. This generation of a template of smaller images from the larger phantom image can be performed in a number of ways. For example, since phantom layouts are standardized, individual image components of the phantom can be readily identified and distinguished from each other, then extracted using straightforward image component isolation techniques.

In the example previously described, each portion of the phantom was part of a target. Thus, for example, with the CDMAM image 200 shown in FIG. 6, far more than 100 individual targets 202 would be generated for display to the operator. An assessment would be obtained on each of these targets 202. As can be appreciated, where the specified set of targets includes each target on a complex phantom such as the CDMAM phantom, a substantial amount of time can be required. As an alternative to viewing each target 202, one embodiment also permits extraction and isolation of a partial subset, a proper subset as understood in mathematical set theory, that contains some, but not all of the full set of targets to be viewed. Thus, for phantom 200 of FIG. 6, it may be sufficient to present a sampling of 20 of the more than 100 targets to the viewer for assessment in a single session. For example, it may only be necessary to view each target of a complex phantom once a month, whereas weekly spot-checking of a collection of fewer than 20 or 30 targets is sufficient as an indicator of system performance between full-phantom readings.

The operator assessment is stored and can be used in a number of ways. For example, the score can be stored as a record verifying that a required procedure was carried out. Various related metadata is also stored along with the scores obtained by the operator. An encoded time stamp could be appended to a file containing information such as the score, operator, system identification, and other data. Other ways of using both the score information and its associated metadata are described subsequently.

One aspect of the present invention is the partial display of isolated individual targets or portions extracted from the phantom to the operator in a predetermined sequence. This is advantageous for the hospital or other facility, since it allows the proper sequence to be followed for obtaining assessment data, without skipping any part of the sequence, and performing steps in order. Operator training on using assessment tools is minimized, allowing the operator to concentrate on image quality, rather than on carrying out a meticulous series of assessments and maintaining records on paper.

The sequential display of targets 202, 402, 404, or 406 (FIGS. 6 and 7) can be presented to the operator in a number of ways. For example, it may not be necessary for each target in the set to be displayed. The sequence can begin at a middle point, using "sorting" logic familiar to those skilled in computer science, reducing the amount of data that must be processed. For example, if an operator can clearly discern a target that provides a certain contrast, there may be advantages to skipping operator response for other targets known to have higher contrast levels. The sequential display can be in a separate window, as shown in the example of FIG. 3. Alternately, the full display screen can be used for display of one or more targets 202, 402, 404, 406 at a time. The operator may be shown some indicator of progress and success, such as with the labeled targets 202 shown in FIG. 6. Alternately, it may be advantageous to present only certain specific information to the operator, using software logic to determine what needs to be shown and in what sequence.

As was noted in the example given earlier, randomized rotation of target 202 can be helpful to help minimize operator "learning" as a factor and obtain an unbiased assessment. The sequence of targets displayed to the operator can be randomized so that some spatially adjacent targets do not appear in sequential order. Other changes in position or sequencing could similarly be used in order to obviate the likelihood of operator-learned patterns that could compromise the assessment.

In some embodiments, it may be possible to make the reading sequence user-configurable. With this feature, a particular site may develop its own standards or tests for system performance based on experience with the equipment. Alternately, a strict schedule of test reads for checking system performance may be mandated, such as by a regional or national regulatory agency.

Improved results can be obtained in some cases by repeating targets more than one time in an assessment session, with or without the operator's knowledge. Thus, for example, targets near an apparent threshold may be shown for operator response two or more times in order to obtain better data.

The readings data that is obtained for each target can be used in a number of ways. The results of individual target readings can be quantified to determine whether or not system performance is reasonably within expected levels. Performance trends can be tracked, enabling early corrective action for system problems.

The operator can receive results in a number of ways. In one embodiment, a simple pass/fail result is provided for phantom imaging. Results can also be transmitted to third parties, such as a manufacturer of system equipment or a regulatory agency.

System Management

The method of the present invention offers a number of potential improvements related to system management. Because the operator assessment is stored in database 380 (FIG. 1), information system 370 has a record that indicates when the procedure was carried out and its relative success. In addition, information system 370 also maintains a history, storing results from each reading performed using the phantom. With this data, performance trends can be tracked with improved accuracy and steps taken to resolve problems before they prevent use of the system. For example, a trend may indicate steadily reduced performance that points to component ageing, the need for system re-calibration, or other important data for system management and maintenance. A manufacturer may also be permitted to access phantom-related readings in order to track system performance for improved field service, scheduling service calls or software updates, for example, at appropriate intervals based on these results.

In addition to keeping data that may be needed for certification or regulatory purposes, the system of the present invention can also be used in conjunction with control software that specifies intervals of time or use at which assessment is needed, the level of assessment that is needed at a particular interval (such as reading either the full set or only a proper subset of targets), and the minimum performance levels that must be met in order to allow operation. Control software may also determine that target test results only be entered from a specific console (such as reader console 310 or diagnosis console 312 in FIG. 1. In this way, for example, the system could require that all assessments for image quality for a specific sequence of test results be entered by a diagnostician rather than by a technician.

Regulatory requirements may dictate a full reading of all targets on the phantom once per month or after obtaining no more than some number of successive images, with an 87.5% success rate or some other threshold success rate. Failure to run this test or to meet the indicated success rate may cause automatic generation of a warning message or report, or automatically file notice with the regulatory board or commission or other responsible party. In one embodiment, failure to perform the test or to pass with a threshold success rate disables system operation until the problem is rectified.

The method of the present invention allows automated notification of mandatory testing that may be needed. A warning message or alert can be sent directly to an operator or to supervisory personnel responsible for proper system maintenance. This message can instruct the operator to obtain a phantom image and to prepare for entry of result data. In one embodiment, the warning message displays with an icon, actuable by the operator, that automatically initiates a test sequence, providing instructions to the operator for obtaining the phantom image and displaying the individual targets for assessment in the desired order.

Monitoring Operator Performance

Another advantage of the present invention relates to operator performance. While automated phantom assessment, emulating the operator with imaging analysis control logic, is not likely to be accepted for proper regulatory or internal validation, automation can be a tool that is useful for verifying that a subjective operator judgment is at least valid or plausible and not in flagrant error.

Figure 8:
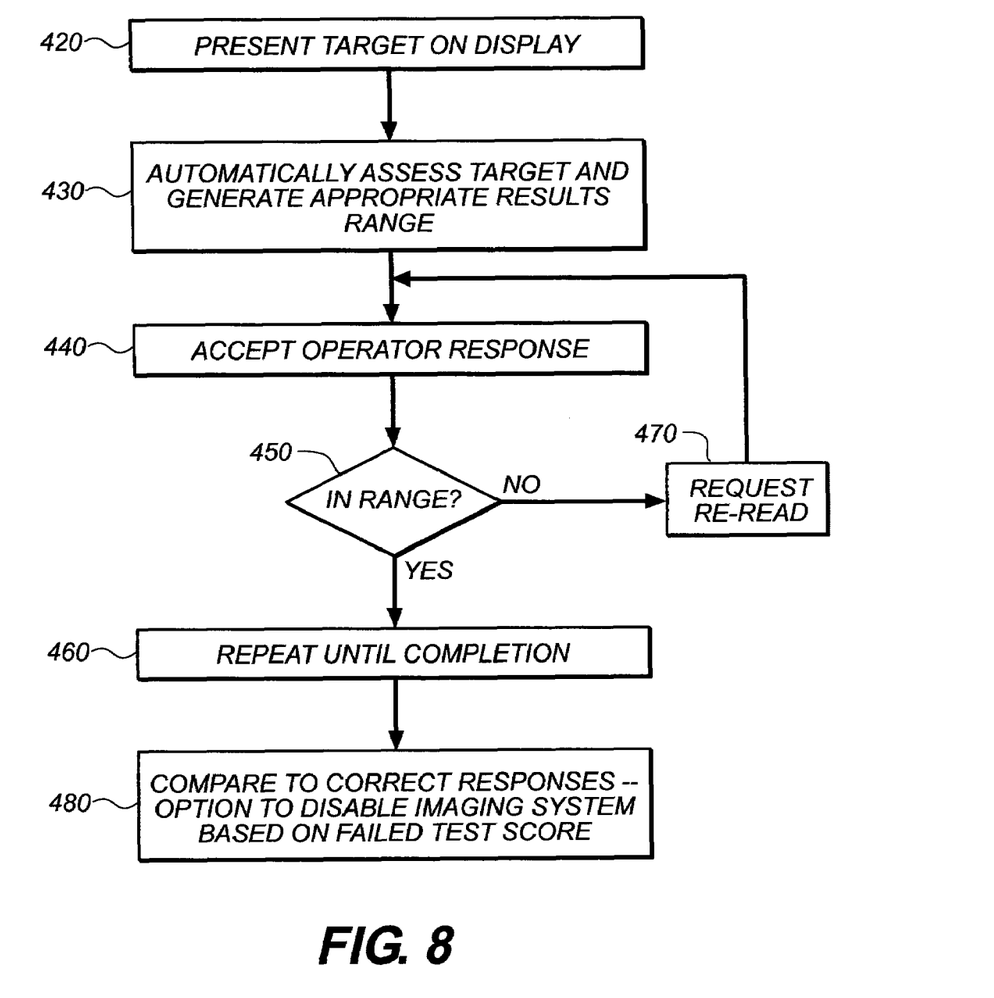
FIG. 8 is a logic flow diagram showing a sequence for automatic verification of an operator entry.

Referring to the logic flow diagram of FIG. 8, there is shown a sequence for automatic verification of an operator entry. In a presentation step 420, an isolated individual target is displayed on-screen in anticipation of the operator response. An automatic assessment step 430 is then executed, in which automated observer software executes and, based typically on probabilistic logic, determines the possible range of results based on its own assessment. In an accept operator response step 440, the operator response is obtained. As described subsequently, automated observer software can be trained to make judgments about target image quality, based on learned criteria, using artificial intelligence techniques, for example, well known to those skilled in the machine intelligence arts. A test operator response step 450 follows, in which the operator response is checked against results from the automated observer. If results are within the expected range, operation continues, moving to the next target in a continue step 460. However, if operator results conflict with the likely results obtained from the automated observer or from other previously stored read data, a request for a re-read can be issued in a repeat request step 470. This request can be visible to the operator, such as with a message: "Please recheck this target" or "Are you sure?" Alternately, a re-read request can be executed without operator knowledge, with the re-read simply scheduled for subsequent display. Also as an option, once the full target has been read, a comparison of the current results with the known correct results may trigger a failed test response and operation of the imaging system may be suspended, step 480.

In another alternative embodiment, results from the automated observer can be stored along with previously stored results from one or more human observers, giving some indication of how closely the readings from these two sources are matched. Statistical results and results from earlier readings can also be stored.

Different operators may have different proficiency levels. The system of the present invention may record information about the operator and may be able to maintain data on how well or how consistently a particular operator performs, and may then direct its target presentation sequence accordingly.

As a check on display hardware and on relative sensitivity of the operator, the system can also provide an initial calibration sequence in which a series of known targets, stored separately and not obtained from the phantom in the current session, is displayed. Operator responses to a known set of targets can thus be used to help ascertain proper system performance and to indicate problems related to the system or to operator perception.

Knowledge-Based Embodiments

The automated observer may be programmed to make a decision for each particular target based on thresholds from detectable image quality characteristics, such as apparent contrast, for example. In addition, the automated observer can also be designed to learn from the history of operator reads and determine, from its experience of actual decisions made by the human operator, the quality of an individual target. Logic methods for this type of "teaching" are well known in the machine intelligence arts.

The use of a trained system can be particularly valuable for evaluating operator performance or the training of a new operator. Two operators shown the same targets may indeed score differently, since the evaluation process is at least somewhat subjective. Two operators can be differently rated based on their performance relative to a standard. A new operator can test and refine skills for reading the phantom by comparing scores obtained in special test sessions, without jeopardizing readings performed by fully trained personnel. Thus, for example, a training mode is provided in one embodiment, allowing an operator to take advantage of automated observer logic, whether learned or simply programmed, without entering new operator data in the database or device history.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein. All documents, patents, journal articles and other materials cited in the present application are hereby incorporated by reference.

Thus, the method and apparatus of the present invention provide an image analysis and presentation system for reading an image signal of a test phantom, detecting target boundaries, isolating phantom image components, calculating image statistics, rendering each component optimally for human observation, obtaining human observations, and using this data for system assessment and performance tracking.

PARTS LIST

- 10. Digitally acquired phantom image
- 20. Algorithm data input
- 30. Individual target identified
- 40. Graphical overlay for target verification
- 50. Human observer verification of target boundaries
- 60. Manual alignment upon automated detection failure
- 70. Image target statistics calculations
- 80. Physical target isolation
- 85. Target rotation (optional)
- 90. Individual target display
- 100. Operator selection capture
- 110. Mouse click interpretation and acknowledgment
- 120. Recording of operator response
- 130. Repeat loop for each target from part 80
- 140. System suspension option based on test failure
- 200. Full presentation of phantom image
- 202. Target
- 210. Overlay for target verification
- 220. Isolated target with automated brightness and contrast display
- 225. Operator control
- 230. Brightness control
- 240. Contrast control
- 250. Grayscale inversion control
- 260. Acknowledgement
- 300. Radiology system
- 310. Reader console
- 312. Diagnosis console
- 320. X-ray unit
- 330. Control logic processor
- 340. Display
- 350. Operator
- 360. Network
- 370. Information system
- 380. Database
- 400. Phantom
- 402. Diagonal line targets
- 404. Dot pattern targets
- 406. Soft dot targets
- 420. Presentation step
- 430. Automatic assessment step
- 440. Accept operator response step

450. Test operator response step
460. Continue step
470. Repeat request step
480. System suspension option based on test failure

The invention claimed is:

1. A method for image quality assessment of a digital radiography system comprising:
   isolating one or more individual targets from a phantom image;
   obtaining operator responses by displaying each isolated individual target and recording a corresponding operator response related to image appearance for each isolated individual target;
   displaying the operator response for one or more targets on the displayed image of the phantom template; and
   storing the accumulated operator responses to obtain the image quality assessment.

2. The method of claim 1 wherein obtaining operator responses further comprises validating the operator response by comparing it against a machine-generated response for the isolated individual target.

3. The method of claim 1 wherein obtaining operator responses further comprises validating the operator response by comparing it against previously stored operator response data.

4. The method of claim 1 wherein at least one or more of the isolated individual targets is displayed a second time in said repeated sequence.

5. The method of claim 1 wherein storing the operator responses further comprises storing identifying metadata related to the one or more targets.

6. The method of claim 1 further comprising providing a pass/fail indicator to the operator.

7. The method of claim 1 further comprising providing operator response results to a third party.

8. The method of claim 1 wherein the step of obtaining operator responses further comprises accepting operator responses from only one of a number of networked consoles.

9. The method of claim 1 further comprising suspending system operation according to the image quality assessment from operator responses.

10. The method of claim 1 further comprising displaying additional targets obtained earlier from a second phantom image.

11. The method of claim 1 further comprising tracking the accumulated operator responses to obtain performance data about the digital radiography system.

12. A method for image quality assessment of a digital radiography system comprising:
   isolating one or more individual targets from a phantom image;
   obtaining operator responses by displaying each isolated individual target and recording a corresponding operator response related to image appearance for each isolated individual target;
   storing the accumulated operator responses to obtain the image quality assessment; and
   highlighting one or more targets for which a response has been recorded on a displayed image of the phantom template.

13. The method of claim 12 further comprising:
   displaying the operator response for one or more targets on the displayed image of the phantom template.

14. A method for image quality assessment of a digital radiography system comprising:
   a) isolating one or more individual targets from a phantom image;
   b) obtaining operator responses by displaying each isolated individual target and recording a corresponding operator response related to image appearance for each isolated individual target; and
   c) storing the accumulated operator responses to obtain the image quality assessment;
   d) wherein the set of one or more isolated individual targets extracted contains fewer elements than does the full set of targets in the phantom template.

15. A method for image quality assessment of a digital radiography system comprising:
   a) isolating one or more individual targets from a phantom image;
   b) obtaining operator responses by displaying each isolated individual target and recording a corresponding operator response related to image appearance for each isolated individual target; and
   c) storing the accumulated operator responses to obtain the image quality assessment;
   wherein isolating one or more individual targets is randomized so that at least some spatially adjacent targets are not displayed in sequential order.

16. A method for image quality assessment of a digital radiography system comprising:
   a) isolating one or more individual targets from a phantom image;
   b) obtaining operator responses by displaying each isolated individual target and recording a corresponding operator response related to image appearance for each isolated individual target; and
   c) storing the accumulated operator responses to obtain the image quality assessment;
   further comprising computing a score according to stored operator responses.

17. A method for monitoring the performance of a digital radiographic imaging apparatus comprising the repeated steps of:
   notifying the operator of the need to obtain a phantom image for assessment;
   isolating an individual target from a phantom image;
   displaying the isolated individual target;
   obtaining an operator response related to image appearance for the isolated individual target;
   validating the operator response against a machine-generated response for the isolated individual target; and
   storing the operator response.

18. The method of claim 17 wherein informing the operator is based on a predetermined interval.

19. The method of claim 17 wherein informing the operator is based on a number of images obtained over a period.

20. A method for monitoring the performance of a digital radiographic imaging apparatus comprising the repeated steps of:
   a) isolating an individual target from a phantom image;
   b) displaying the isolated individual target;
   c) obtaining an operator response related to image appearance for the isolated individual target;
   d) validating the operator response against a machine-generated response for the isolated individual target; and
   e) storing the operator response;
   further comprising computing a score indicating image quality according to the stored operator responses.

21. The method of claim 20 further comprising disabling equipment operation based on said score.

22. The method of claim 20 further comprising generating a message based on said score.

23. The method of claim 20 further comprising displaying a performance indicator based on the score.

* * * * *